Oct. 30, 1962
M. LANDAU ET AL
3,061,421
PURIFICATION OF FUEL GASES
Filed July 13, 1959
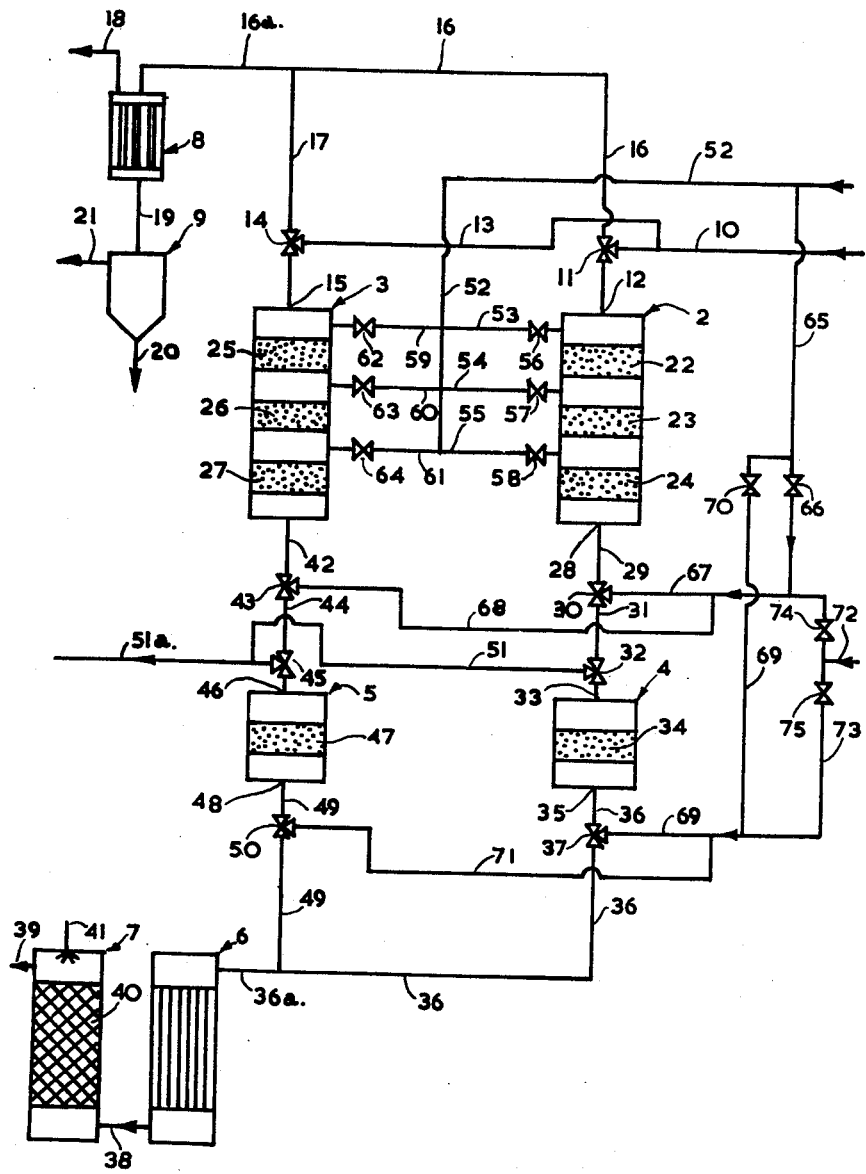
Inventors
Manfred Landau
Kenneth Hope Todhunter
Thomas Kennaway
by Benj. T. Rauber
their attorneys 3,061,421
PURIFICATION OF FUEL GASES
Manfred Landau, Sale, Kenneth Hope Todhunter, Northenden, Manchester, and Thomas Kennaway, Cheadle Hulme, England, assignors to Simon-Carves Limited, Stockport, England, a British company
Filed July 13, 1959, Ser. No. 826,624
Claims priority, application Great Britain July 18, 1958
25 Claims. (Cl. 48—197)

This invention has for its object to provide an improved method of purifying fuel gases, such as coal gas, whereby organic sulphur compounds, such as carbon disulphide, carbon oxysulphide, mercaptans and ring compounds, such as thiophene, are removed in addition to hydrogen sulphide and at the same time the carbon monoxide content is reduced to small or negligible values, so that the toxicity of the gas is reduced.

Hydrogen sulphide is easily removed from gas streams by cold or hot contact masses capable of forming solid sulphides of low vapour pressure. Under certain circumstances such contacts will catalyse the conversion of organic sulphur compounds to hydrogen sulphide. This conversion is most efficient if the hydrogen sulphide so formed is simultaneously fixed on the catalyst as solid sulphide. This accelerates the decomposition of the organic sulphur compounds and prevents the formation of organic sulphur compounds from hydrogen sulphide by the reverse reaction.

Steam will increase the vapour pressure of hydrogen sulphide over solid sulphide. If steam is therefore used to convert some carbon monoxide to hydrogen and carbon dioxide, the desulphurisation reaction will be correspondingly impaired.

It has been found, however, that if a catalyst active at relatively low temperatures is used, inlet steam percentages can be kept sufficiently low to give good sulphur removal, while converting acceptable quantities of carbon monoxide. If the reaction is caused to proceed at elevated pressure, more hydrogen sulphide will tend to be retained by the catalyst and hence more steam can be used to convert carbon monoxide.

Acording to the invention, a method of treating fuel gases comprises the step of removing carbon monoxide therefrom simultaneously with the removal therefrom of sulphur compounds.

The gas is treated with steam at a temperature of 200°–800° C. but preferably 350°–500° C. in the presence of a catalyst, for the decomposition of organic sulphur compounds and for the conversion of carbon monoxide. Absorption of hydrogen sulphide takes place either on the conversion catalyst or on a separate absorbent mixed with it. The steam percentage is adjusted to maintain the vapour presure of free hydrogen sulphide over the catalyst at a minimum. If the conversion of carbon monoxide in one stage is not sufficient, steam can be injected in a second stage to replace that converted in the first stage and more carbon monoxide then be removed. This second stage will further remove additional organic and inorganic sulphur compounds from the gas as well as convert more carbon monoxide.

This treatment results in the conversion of organic sulphur compounds to hydrogen sulphide, which is absorbed, together with hydrogen sulphide already present in the gas, and also results in the simultaneous conversion of carbon monoxide into hydrogen and carbon dioxide.

A suitable catalyst is iron oxide, which serves also as the absorbent for hydrogen sulphide. The iron oxide may be mixed with other chemicals, such as manganese, chromium or copper compounds, which assist in promoting the reactions. The catalyst may be uniform or may be absorbed on a porous or refractory support. The catalyst may be in powder or granular form and may be used in a fixed bed, in fluidised form, or in a moving burden process. The gas may be supplied at atmospheric or elevated pressure. The process can thus be made part of a high pressure gas production system without the necessity of depresurising the gas before purification.

The treatment of the gas may be carried out in a single reactor or in a number of reactors in series; each reactor comprising one or more stages. The steam percentages and temperatures for each reactor, and for each stage in each reactor, are adjusted to retain the maximum hydrogen sulphide content in each catalyst bed. The bulk of the sulphur compounds and carbon monoxide are removed, or converted, by a relatively-fouled catalyst and absorbent at a high temperature in the first stage or reactor; the process being completed by a cleaner catalyst, or catalysts, and absorbent, or absorbents, at a lower temperature in subsequent stages or reactors.

It has been found that thiophene, an organic sulphur compound present in gas and resistant to most catalytic treatment, can be removed by more than 50 percent of its inlet value for each reactor, as long as hydrogen sulphide is being absorbed by the catalyst. Thus, by the method indicated above, gas can be substantially freed of thiophene as well as of other organic sulphur compounds, a result which has not previously been considered possible of attainment under practical operating conditions.

The fouled catalyst and absorbent may be regenerated by blowing air and flue gas, or air and steam, into the hot bed at a temperature of from 300°–1000° C. but preferably 400°–700° C. the process being regulated to prevent overheating of the catalyst. The sulphur contained in the absorbent is thereby removed by the steam or oxygen and the product gases worked up for producing either elemental sulphur direct, or sulphuric acid, as described hereunder. The reactor, or reactors, used may comprise two parallel reactors, or banks thereof, of which one reactor, or bank, may be used for gas treatment while the catalyst and the absorbent in the other is being regenerated.

The catalyst is regenerated by treatment with a mixture of steam and air, or inert gas and air, and the temperature of the catalyst is carefully controlled. According to the steam/air ratio employed, elemental sulphur can be directly recovered from the product gases. Steam forms hydrogen sulphide with the catalyst and some of it burns in air to sulphur dioxide. When these two substances are in the correct proportions, elemental sulphur is formed from them. The product can be used for sulphuric acid manufacture or for other known purposes. When an excess of air is used, sulphur dioxide is the only product and this can be passed to a wet contact plant for sulphuric acid manufacture.

This process may be applied to fuel gases of all types, such as continuous vertical retort gas, coke oven gas, water gas, producer gas, slagging generator gas, catalytic oil gas, and the like. By adjustment of the steam/gas ratio the process can be used to produce, from the raw gases mentioned hereabove, a gas, of any desired hydrogen/carbon monoxide ratio, such as for the production of ammonia, of fertilisers or of purified synthesis gas for hydrocarbon synthesis; an increase in the steam proportion resulting in the conversion of a greater proportion of carbon monoxide. The process may be applied to fuel gas containing hydrogen sulphide in addition to organic sulphur and carbon monoxide, or to fuel gas which has been freed of most, or all, of its hydrogen sulphide content. The process would, in this case, be concerned with removing the residual hydrogen sulphide and the bulk of the organic sulphur from the fuel gas, besides converting carbon monoxide and producing a partly detoxified fuel gas.

By treatment as described, the fuel gas may be freed from sulphur, gum formers and unsaturated compounds to a sufficient extent to make it suitable for the conversion of the residual carbon monoxide to methane by means of hydrogen over a nickel catalyst, which can be regenerated after fouling. Such a catalyst will remain active, with considerable sulphur contaminations, for some time. The methane synthesis assists in regaining some of the calorific value lost in the process and restores to original the burning characteristics of the fuel gas.

The steam/gas ratio may be adjusted according to the carbon monoxide conversion desired, and the synthesis of methane required, if any, according to the required calorific value of the fuel gas.

Where methane synthesis is used, a proportion of the fuel gas may be by-passed around the methane synthesis stage and subsequently be added to the methane to reduce its calorific value.

Where, however, it is desired to increase the calorific value of the detoxified fuel gas in an economical manner, use may be made of such waste material as coke breeze. This coke breeze, which is of little practical value as a carbonisation product, may be processed in a slagging generator or the like to produce slagging generator gas which is of a very low calorific value and, as a gas, is of little commercial value. Because of the low value of the coke breeze, however, this gas can be produced at an attractively low cost. If this slagging generator gas is then passed firstly through a desulphurisation reactor, as described hereabove in relation to a normal fuel gas, and is then subjected to methane synthesis, the methane so produced can be used to enrich the detoxified fuel gas and increase its calorific value without reducing its cleanliness and without the necessity for using the more valuable fuel gas for methane synthesis.

In addition to coke breeze, suitable cheap gases for methane synthesis and subsequent use for enrichment of the more costly fuel gas may also be obtained from such waste or unwanted carbonaceous materials as coal dust, tar, heavy oil or oil sludge and like materials capable of being processed to produce a gas containing hydrogen and carbon monoxide and having little or no commercial value for other purposes.

The following examples of stages of a fuel gas treatment process are given by way of example only, and are in no way limitative of the invention:

*Example 1.—Sulphur and Carbon Monoxide Removal*

Fuel gas containing approximately 400 grains of hydrogen sulphide and 30 grains of organic sulphur (of which 6 grains is thiophene) per 100 cubic feet is passed into the first stage of a reactor at a temperature of 460° C. The calorific value of the gas is 475 British thermal units (B.t.u.) per cubic foot and the carbon monoxide content is 18 percent by volume.

10 parts of steam per 100 parts of fuel gas are added before the gas contacts the first catalyst bed; some of this steam being consumed in the reaction. The hydrogen sulphide content of the gas falls to 20 grains per 100 cubic feet, and the organic sulphur content falls to 4 grains per 100 cubic feet, of which 3 grains per 100 cubic feet is thiophene; the balance of the sulphur being retained by the catalyst. The carbon monoxide content at the outlet is reduced to 13.2 percent by volume.

The gas now passes into the second stage of the reactor, where a further 10 parts of steam per 100 original parts of gas is now added. The gas from the first stage contained some residual steam so that the final steam content is 13.5 percent by volume. (The steam available for reaction is increased as the carbon monoxide percentage decreases, thus maintaining the driving force of the reaction at its optimum.)

The gas contacts the second stage catalyst bed at a temperature of 440° C. and the hydrogen sulphide content at the outlet to this stage is reduced to 3 grains per 100 cubic feet. The organic sulphur content is 2 grains per 100 cubic feet, of which 1.5 grains per 100 cubic feet is thiophene, and the carbon monoxide outlet content is reduced to 8.5 percent.

In the third stage, a further 10 parts of steam per 100 original parts of gas is added, which, with the residual steam from the second stage, gives an inlet steam percentage of 16.8 percent for the third stage. The inlet temperature is 410° C.

In the third stage the hydrogen sulphide content at the outlet is reduced to less than 0.5 grain per 100 cubic feet, and the organic sulphur content, all of which is thiophene, is reduced to 0.5 grain per 100 cubic feet. The final outlet carbon monoxide content is down to 4.6 percent. These figures show a gas which has been substantially desulphurised and detoxified.

The calorific value of the final gas is 429 B.t.u. per cubic foot, which can be increased by the addition of liquid petroleum gas or by synthesis of methane as follows.

*Example 2.—Methane Synthesis and Carbon Monoxide Reduction*

The above fuel gas, containing 1 grain per 100 cubic feet of sulphur, is passed into a reactor containing a regenerable methane synthesis catalyst such as nickel. The inlet carbon monoxide content of the gas is 4.6 percent by volume.

Some of the carbon monoxide in the gas reacts with hydrogen therein, in the presence of the catalyst, to produce methane and the calorific value of the gas is increased to 460 B.t.u. per 100 cubic feet. The outlet carbon monoxide content falls to 2.1 percent of the dry gas, and residual organic sulphur is converted to hydrogen sulphide which needs to be scrubbed out of the gas before distribution. The nickel catalyst requires periodic regeneration.

As only a small amount of methane synthesis is required the gas may have a higher sulphur content and reaction temperatures may be higher and efficiencies lower than for processes producing higher concentrations of methane.

*Example 3.—Reduction of Organic Sulphur and Carbon Monoxide*

Coal gas containing 20 grains of organic sulphur per 100 cubic feet, and only minute traces of thiophene, is passed with 20 percent of steam over an iron catalyst at a temperature of 450° C.

The total sulphur content at the outlet from the catalyst is 2 grains per 100 cubic feet, of which 1.5 grains per 100 cubic feet is hydrogen sulphide and 0.5 grain per 100 cubic feet is organic sulphur. The inlet percentage of carbon monoxide is 15 percent and the outlet content 3 percent.

*Example 4.—Reduction of Carbon Disulphide and Carbon Monoxide*

Fuel gas containing over 600 grains of sulphur, in the form of carbon disulphide, per 100 cubic feet is passed over a catalyst with 4 percent steam by volume. The carbon monoxide content is 12 percent by volume.

At the outlet, the carbon monoxide content is reduced to 8.8 percent and the sulphur content to 5 grains per 100 cubic feet.

*Example 5.—Reduction of Thiophene and Carbon Monoxide*

Coal gas containing 20 grains per 100 cubic feet of thiophene and 15 percent carbon monoxide is passed through a catalyst with 20 percent by volume of steam. The outlet contains 9 grains per 100 cubic feet of organic sulphur, mostly thiophene, and 3 percent of carbon monoxide.

*Example 6.—Catalyst Regeneration*

Fouled catalyst containing 20 percent fixed sulphur, in the form of iron sulphide, is heated to 700° C. and has air, mixed with 5 percent by volume of steam, passed therethrough. The outlet gas contains 7 to 8 percent of sulphur dioxide and after regeneration the catalyst contains 0.5 percent residual sulphur.

*Example 7.—Recovery of Elemental Sulphur*

Fouled catalyst containing 20 percent fixed sulphur as a sulphide is treated with a mixture of 80 parts steam and 20 parts air at a temperature of 450° C. The outlet gas contains 1 percent sulphur dioxide and from the condensate elemental sulphur of more than 98% purity can be recovered; this representing more than half of the sulphur in the fouled catalyst which, after regeneration, contains no more than 0.5 percent of sulphur.

A suitable installation for carrying out the process of the present invention is illustrated diagrammatically in the form of a flow diagram in the accompanying drawing. It will be clear, however, that such an arrangement is not exhaustive of the forms which such an installation could conveniently take.

As illustrated in the drawing, the installation comprises essentially two three-stage reactors 2 and 3, two methane synthesis reactors 4 and 5, which are connected in series—parallel with a common heat exchanger 6, and a gas scrubber 7. The installation also comprises a further heat exchanger 8 and a settling tank 9.

Fuel gas from a source thereof is passed to the installation, through a conduit 10 and a two-way valve 11, to the gas inlet 12 of the three-stage reactor 2. A further conduit 13 by-passes the valve 11 and leads through a two-way valve 14 to the gas inlet 15 of the three-stage reactor 3. A conduit 16 leads from the third connection of the two-way valve 11 to the inlet of the heat exchanger 8 and a further conduit 17 connects the third connection of the two-way valve 14, through a portion 16a of the conduit 16, with the heat exchanger 8.

A vent 18 in the heat exchanger 8 leads to atmosphere and a conduit 19 connects the heat exchanger 8 with the setting tank 9. A discharge conduit 20 for slurry leads to a suitable discharge point from the base of the settling tank 9, which is also provided with a liquid overflow 21.

The reactor 2 is provided with three vertically-separated catalyst beds 22, 23 and 24 and the reactor 3 is provided with three similar catalyst beds 25, 26 and 27.

The outlet 28 of the reactor 2 leads through a conduit 29, a two-way valve 30, a further conduit 31, and a second two-way valve 32, to the inlet 33 of the methane synthesis reactor 4 in which is located a nickel or other methane synthesis catalyst 34. The outlet 35 of the reactor 4 leads through a conduit 36, in which is interposed a two-way valve 37, to the inlet of the heat exchanger 6.

The outlet of the heat exchanger 6 leads through a conduit 38 to the base of the gas scrubber 7, the outlet of which leads from the top of the scrubber 7 through a conduit 39 to a gas holder or other storage container. The gas scrubber 7 contains suitable mesh or like screens 40, as known in the art, and liquid sprays are directed onto the screens 40 from a conduit 41 connected to a suitable source.

The outlet from the reactor 3 is connected through similar conduits 42 and 44 and two-way valves 43 and 45 with the inlet 46 of the methane synthesis reactor 5, which is provided with a methane synthesis catalyst 47 similar to the catalyst 34. The outlet 48 of the reactor 5 is connected with the heat exchanger 6 and scrubber 7 through a conduit 49, in which is a two-way valve 50 and a portion 36a of the conduit 36.

The third connections of the two-way valves 32 and 45 are connected by conduits 51 and 51a with a waste receptacle or atmosphere.

Steam, for feeding the stages of the reactors 2 and 3 with the requisite amount of steam, is fed to the installation through a conduit 52 from a suitable source thereof. From the conduit 52, branches 53, 54 and 55 lead, respectively, through valves 56, 57 and 58 to the spaces in the reactor 2 above the respective catalyst beds 22, 23 and 24. Similar branches 59, 60 and 61 lead from the conduit 52 through valves 62, 63 and 64 to the respective spaces above the catalyst beds 25, 26 and 27 in the reactor 3.

A conduit 65 leads from the steam source through a valve 66 to a further conduit 67 which is connected to the third connection of the valve 30, and a by-pass conduit 68 leads from the conduit 67 to the third connection of the valve 43. A by-pass conduit 69, leads from the conduit 65 through a valve 70 to the third connection of the two-way valve 37 and a further by-pass conduit 71 leads from the conduit 69 to the third connection of the two-way valve 50.

Compressed air from a suitable source thereof is lead into the installation through a conduit 72 and a header 73, which is connected into the conduits 65, 67 and 69. Suitable adjustable valves 74 and 75 are inserted in the header 73 between the supply conduit 72 and the respective conduits 66 and 69.

In describing the operation of the installation it is assumed that it has been in operation for some time and that the catalysts 25, 26 and 27 in the reactor 3 and the catalyst 47 in the methane synthesis reactor 5 are fouled and that the reactors 2 and 4 are to be brought into operation whilst the fouled catalysts 25, 26, 27 and 47 are simultaneously being regenerated.

Fuel gas is being admitted to the installation through the conduits 10 and 13, steam through the conduits 52 and 65, and air through the conduit 72 and header 73.

Steam is admitted to the spaces above the catalysts 22, 23 and 24, in the reactor 2, through the conduits 53, 54, 55 and the valves 56, 57 and 58 respectively, are adjusted to give the desired amount of steam flow above each catalyst. At the same time, the valves 62, 63 and 64 are shut down to prevent the flow of steam into the reactor 3. The valves 30, 32 and 37 are actuated to provide a passage through the conduits 29 and 31, methane synthesis reactor 4 and conduit 36 to the heat exchanger 6.

The valve 11 is then actuated to provide a gas flow from the conduit 10 into the reactor 2, and simultaneously the valve 14 is actuated to place the inlet 15 of the reactor 3 in communication with the heat exchanger 8 and simultaneously to cut off the flow of gas into the reactor 3 from the conduit 13.

The gas then passes through the catalysts 22, 23 and 24, as described in Example 1 hereabove, and substantially-clean gas leaves the outlet 28 of the reactor 2 and passes through the valves 30 and 32 into the methane synthesis reactor 4, where it is subjected to the reactions described in Example 2 hereabove.

From the outlet of the methane synthesis reactor 4, the cleaned and enriched gas passes through the valve 37 and conduit 36 to the heat exchanger 6, wherein its steam content is condensed, and thence to the scrubber 7, where its hydrogen sulphide content is washed out by liquid sprays from the conduit 41.

The cleaned and scrubbed gas then passes through the conduit 39 to a domestic supply network or other supply point.

Simultaneously with the treatment of the gas in the reactors 2 and 4, regeneration of the catalysts 25, 26, 27 and 47 is taking place.

Opening of the valve 14 has placed the reactor 3 in communication with the heat exchanger 8 and settling tank 9. The valves 43 and 50 are now operated to place the outlets of the reactors 3 and 5 in communication, respectively, with the conduits 68 and 71. The valve 45 is actuated to close the connection between the reactors 3 and 5 and to place the inlet 46 of the methane synthesis reactor 5 in communication with the conduit 51a and a waste receptacle or atmosphere.

The valve 66 is adjusted to give the desired steam supply to the reactor 3 for regeneration of the catalysts therein, and the valve 70 is adjusted to give the correct steam supply to the reactor 5 to regenerate the methane synthesis catalyst 47 therein, all as described hereabove.

Simultaneously, the valves 74 and 75 are adjusted to supply the desired amount of air for mixture with the steam in the reactors 3 and 5 also as described hereabove; the air, passing along the respective conduits 73 and 68 or 71, is entrained in the steam. If desired, suitable aspirating devices may be inserted at the junctions between the air and steam conduits to ensure the entrainment of the desired quantity of air in the steam, or vice versa.

The steam and air being passed through the catalyst 47 regenerates the catalyst as previously described and is, together with the deposits from the catalyst, vented to atmosphere, or to a suitable waste container, through the conduit 51a. The steam and air being passed through the catalysts 27, 26 and 25, carries with it the sulphur compounds absorbed by the catalysts and carries them to the heat exchanger 8 where the steam is condensed. The air, with some admixture of sulphur dioxide, is vented to atmosphere through the conduit 18 whilst the condensate with, as in Example 7, precipitated elemental sulphur therein, gravitates to the settling tank 9. The sulphur slurry therefrom is drawn off through the conduit 20 and the water allowed to overflow at 21.

Normally, the valves 66, 70, 74 and 75, once adjusted, may be left open, although interim adjustment may be necessary to correct malfunctions which may occur.

When the catalysts 25, 26, 27 and 47 have been regenerated or, alternatively, when the catalysts 22, 23, 24 and 34 require regeneration, the gas and steam are transferred to reactors 3 and 5 by manipulation of the valves 56 to 58 and 62 to 64 and the two-way valves 11, 30, 32, 37 and 14, 43, 45 and 50, and the reactors 3 and 5 come into operation in a similar way, whilst the catalysts 22, 23, 24 and 34 are similarly being regenerated.

What we claim is:

1. A process for purifying fuel gases containing carbon monoxide and gaseous sulphides including organic sulphides which comprises incorporating steam into the fuel gas in total amount slightly exceeding the amount required to react with the carbon monoxide to form carbon dioxide and hydrogen and to convert the organic sulphides to hydrogen sulphide and contacting said mixture fuel gas and steam at a temperature between 200° C. and 800° C. with a solid catalyst and sulphide absorbent and comprising predominantly iron oxide as a catalyst to catalyze the reaction between the steam and the carbon monoxide and the organic sulphides and to form a solid metallic sulphide, thereby to remove volatile sulphides and carbon monoxide from the gas, the amount of steam in the gaseous mixture in contact with the catalyst being sufficiently low to avoid substantial reformation of hydrogen sulphide by reaction with iron sulphide formed in the catalyst.

2. The process of claim 1 in which said gases are passed in succession into contact with successive catalysts and in which steam is added to said gases between said successive catalysts.

3. The process of claim 1 in which the gas mixture from said process is admixed with steam and passed through a hydrogenation catalyst to convert the carbon monoxide therein to methane.

4. The process of claim 1 in which the percentage of steam to the fuel gases is increased between said successive catalysts.

5. The process of claim 1 in which said catalyst contains at least one member of the group consisting of manganese, chromium and copper compounds.

6. The process of claim 1 in which the temperature of the catalyst is held between 350° C. and 500° C.

7. The process of claim 1 in which the catalyst is regenerated at intervals by oxidation to remove the accumulated sulphur content.

8. A process according to claim 1, wherein the fuel gas is passed in series through a plurality of stages each comprising a reactor containing a separate catalyst and the steam is applied to the fuel gas in each said stage independently of the other stages; the amount of steam applied to each stage being sufficient only to convert a proportion of the carbon monoxide therein with inhibiting the sulphur-absorbing characteristics of the catalyst.

9. The process of claim 8 in which the percentage of steam in the successive stages is increased and the percentage of volatile sulphides and of iron sulphide in the catalyst are less than in the earlier stages.

10. The process of claim 9 in which the steam is sufficient in the final stage to convert substantially all of the carbon monoxide to hydrogen and carbon dioxide.

11. A process according to claim 8, wherein the amount of steam applied to each stage is adjusted to cause the conversion of substantially all the carbon monoxide in the fuel gas, whereby to condition the gas for the subsequent production of ammonia.

12. A process according to claim 7, comprising the steps of diverting the flow of fuel gas from the reactor and subjecting the catalyst to the action of steam and air for the removal of absorbed sulphur compounds therefrom.

13. A method according to claim 12, wherein the air/steam ratio is such as to enable the recovery of elemental sulphur from the absorbed sulphur compounds released from the catalyst.

14. A method according to claim 12, wherein the air/steam ratio is such as to enable the recovery of sulphur dioxide from sulphur compounds released from the catalyst.

15. A method according to claim 7, wherein the fuel gas and steam are passed selectively to either one of two reactors, and the catalyst in the reactor to which no gas and steam is being passed is subjected to regeneration to remove therefrom the absorbed sulphur compounds.

16. A method according to claim 1, comprising the further step of readjusting the burning characteristics of the fuel gas, after treatment, by methane synthesis over a nickel catalyst whereby to reduce still further the carbon monoxide content of the fuel gas.

17. A method according to claim 1, wherein the fuel gas is coal gas.

18. A method according to claim 1, wherein the fuel gas is coke oven gas.

19. A method according to claim 1, wherein the fuel gas comprises carburetted water gas.

20. A method according to claim 1, wherein the fuel gas is a gas of low calorific value.

21. A method according to claim 20, wherein the fuel gas comprises the gas produced from a water gas generator prior to carburettion.

22. A method according to claim 20, wherein the fuel gas comprises producer gas.

23. A method according to claim 20, wherein the fuel gas comprises slagging generator gas.

24. A method according to claim 20, wherein the fuel gas of low calorific value is subjected to desulphurisation in a separate series of reactors and is subsequently treated by methane synthesis over a nickel catalyst to increase the calorific value thereof, the resultant gas being mixed with fuel gas, the calorific value of which has been reduced by desulphurisation and carbon monoxide conversion, to increase the caloric value of the detoxified fuel gas.

25. A method according to claim 24, wherein the detoxified fuel gas, the calorific value of which is increased, is a coal, coke oven or carburetted water gas.

References Cited in the file of this patent

UNITED STATES PATENTS

| | | |
|---|---|---|
| 1,918,254 | Faber | July 18, 1933 |
| 2,024,393 | Sexauer | Dec. 17, 1935 |
| 2,110,240 | Roelen et al | Mar. 8, 1838 |
| 2,239,000 | Goombridge et al. | Apr. 22, 1941 |
| 2,487,981 | Reed | Nov. 15, 1949 |

FOREIGN PATENTS

| | | |
|---|---|---|
| 130,654 | Great Britain | Aug. 14, 1919 |
| 340,016 | Great Britain | Dec. 16, 1930 |
| 341,444 | Great Britain | Jan. 12, 1931 |